United States Patent [19]
Redman

[11] 4,133,612
[45] Jan. 9, 1979

[54] ENDLESS FIBER INTERFEROMETER ROTARY MOTION SENSOR

[75] Inventor: Charles M. Redman, Las Cruces, N. Mex.

[73] Assignee: The United States of America as represented by the Secretary of the Army, Washington, D.C.

[21] Appl. No.: 813,361

[22] Filed: Jul. 6, 1977

[51] Int. Cl.² .............................................. G01B 9/02
[52] U.S. Cl. .................................. 356/350; 350/96.13
[58] Field of Search ............. 356/106 LR; 350/96.13, 350/96.15, 96.17, 96.19

[56] References Cited

U.S. PATENT DOCUMENTS

| | | | |
|---|---|---|---|
| 3,589,794 | 6/1971 | Marcatili | 350/96 |
| 3,666,349 | 5/1972 | Hubby, Jr. | 350/149 |
| 3,714,607 | 8/1970 | Cutler | 332/7.51 |
| 3,841,758 | 10/1974 | Gievers | 356/106 LR |
| 3,846,025 | 11/1974 | Wilber | 356/106 LR |
| 3,910,373 | 10/1975 | Newburgh et al. | 181/0.5 |
| 4,013,000 | 5/1977 | Rogelnik | 350/96.13 |

OTHER PUBLICATIONS

Stone, J. et al., "Nd:YAG Single-Crystal Fiber Laser" Appl. Phys. Lett., vol. 25, No. 1, Jul. 1976.
"Fiber Blampaths expected to enhance Laser Gyro's Accuracy and Slash Cost" Laser Focus, vol. 11, No. 6, Jun. 1975.

Primary Examiner—Conrad J. Clark
Attorney, Agent, or Firm—Nathan Edelberg; Robert P. Gibson; Saul Elbaum

[57] ABSTRACT

A rotary motion sensor which employs an endless, closed-loop, multiple turn fiber interferometer. Coherent laser radiation is coupled into the fiber interferometer in both a clockwise and counter-clockwise direction and is permitted to traverse the entire interferometer waveguide many times so as to increase the cumulative phase shift due to multiple traversal. Means are provided for coupling the coherent radiation into and out of the fiber interferometer. Means are also provided for generating a pair of reference optical signals which are heterodyned with the extracted clockwise and counter-clockwise signals to produce a pair of beat frequency signals at manageable, acoustic frequencies. The relative cumulative phase shift between the output acoustic signals and the circulating signals are the same so as to provide an extremely precise measurement of the rate of rotation. In a preferred embodiment, the coupling means as well as the reference signal generating means comprise an acoustic waveguide for generating an acousto-optic grating across the paths of the coherent optical signal and the fiber interferometer.

10 Claims, 1 Drawing Figure

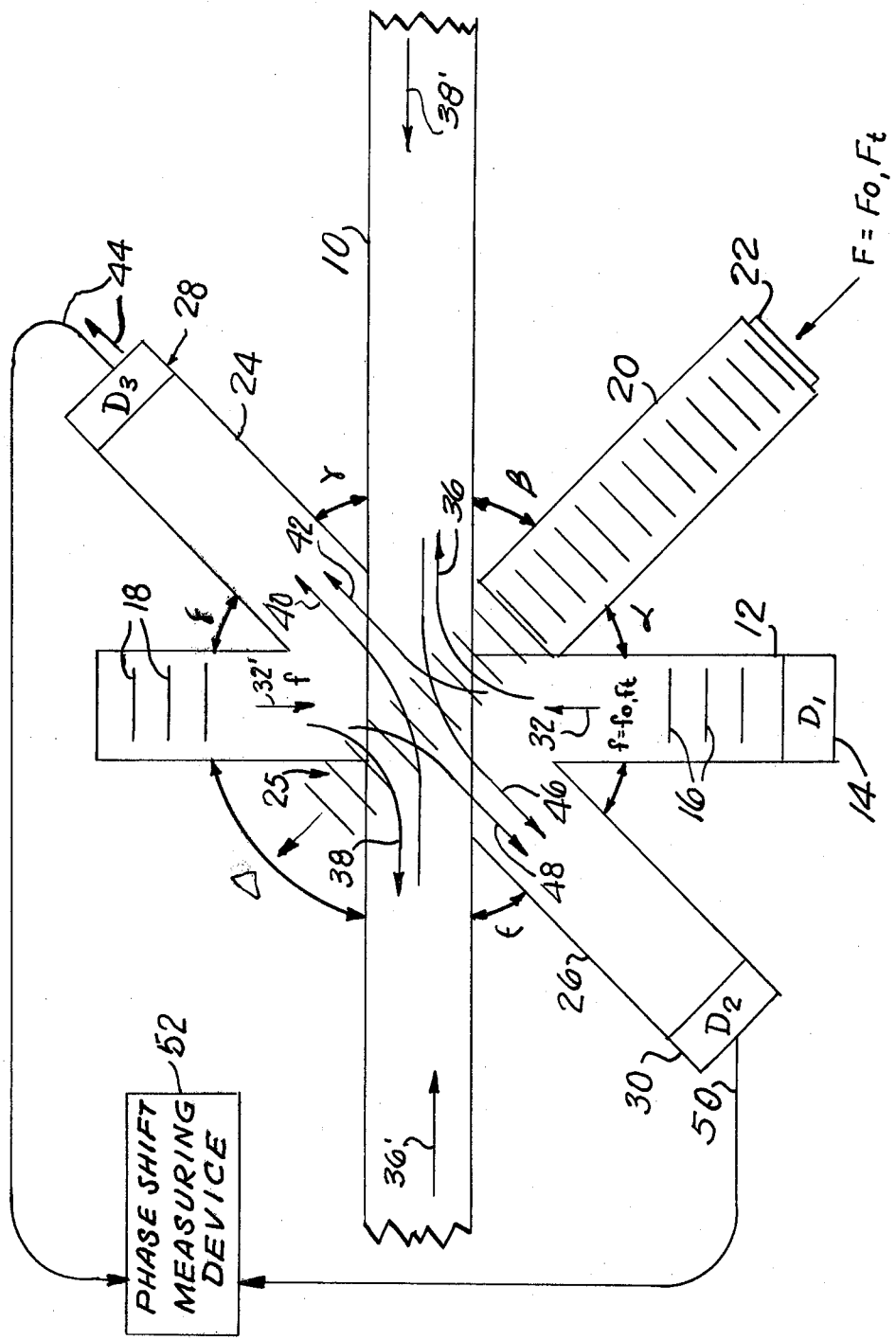

ENDLESS FIBER INTERFEROMETER ROTARY MOTION SENSOR

RIGHTS OF THE GOVERNMENT

The invention described herein may be manufactured, used, and licensed by or for the United States Government for governmental purposes without the payment to me of any royalty thereon.

BACKGROUND OF THE INVENTION

1. Field of the Invention

The present invention is related to rotary motion sensors and, more particularly, is directed towards a rotary motion sensor which employs an endless multiple turn fiber interferometer.

2. Description of the Prior Art

As pointed out in my copending U.S. application Ser. No. 813,362, filed July 6, 1977, fiber interferometers have recently come into their own as means for measuring the rate of rotation of bodies based upon the Sagnac interferometer effect.

In my copending application, I describe a practical, fieldworthy rotary motion sensor which employs a fiber interferometer having first and second ends into which coherent radiation from a fiber laser is inserted in clockwise and counter-clockwise directions. After the coherent radiation has made one traversal of the multiple turn optical waveguide, the respective clockwise and counterclockwise signals, phase shifted in proportion to the rotational rate of the system, are extracted from the fiber interferometer and are fed to a pair of heterodyne detectors. Also fed to each detector is a reference signal which comprises the laser frequency offset by an acoustic frequency, the latter being provided by an acousto-optic grating which serves to offset and couple the coherent radiation to the detectors. The output from the respective detectors comprise a pair of signals at the acousto-optic drive frequency which have the same phase relationship as the coherent optical signals. The relative phase between the two acoustic signals may be detected by conventional electronics to provide a measure of the rotation rate of the system.

While the system set forth in my copending application as described above is advantageous over the prior art, the resolution and accuracy achievable by same is somewhat limited due to the relatively small phase shifts effectuated in the coherent signals as they traverse the multiple turn optical waveguide only a single time apiece. The very small phase shifts can lead to not inconsiderable errors in detection and measurement. It would clearly be desirable if a system could be provided in which larger phase shifts of the counter-rotating radiation could be achieved to therefore increase the precision and accuracy of the measurement technique. It is toward this end that the present invention has been advanced.

OBJECTS AND SUMMARY OF THE INVENTION

It is therefore a primary object of the present invention to provide a fiber interferometer rotary motion sensor which overcomes all of the disadvantages noted above with respect to earlier systems.

Another object of the present invention is to provide a fiber interferometer rotary motion sensor which operates in accordance with the Sagnac interferometric technique and which achieves great dimensional phase shifts to permit more easy data reduction and more precise rotational measurement than heretofore possible.

A further object of the present invention is to provide a rotary motion sensor which utilizes a fiber interferometer to achieve a measurement device which is compact, rugged, and readily adaptable for use in missiles, aircraft, and other limited space vehicles, whose output signals may be processed by ordinary electronic instrumentation, and whose measurements permit a degree of accuracy and precision heretofore unobtainable.

The foregoing and other objects are attained in accordance with one aspect of the present invention through the provision of a rotary motion sensor which comprises means for generating a coherent optical signal at a first frequency, an endless, closed loop, multiple turn fiber interferometer, and means for coupling the coherent optical signal into the interferometer in first and second opposed directions. Means are also provided for generating first and second reference optical signals which are each offset in frequency from said first frequency by a second frequency. Further, means are provided for coupling the coherent optical signals travelling in the first and second opposed directions out of the fiber interferometer after multiple traversals thereof. Means are also provided for mixing the coherent optical signals coupled out of the interferometer with the first and second reference signals, respectively, to produce first and second signals of substantially the same frequency. Finally, means are provided for detecting the relative phase shift between the first and second signals produced by the mixing means which provides a measure of the rotational rate of the system.

In accordance with other aspects of the present invention, the means for coupling the coherent optical signal into the interferometer, the means for generating the first and second reference optical signals, and the means for coupling the coherent optical signals out of the fiber interferometer, all comprise the same means for generating an acousto-optic grating across the paths of the coherent optical signal and the fiber interferometer. In a preferred embodiment, the means for generating an acousto-optic grating comprises an acoustic waveguide driven by a transducer at a second, acoustic frequency.

In accordance with other aspects of the present invention, first and second extraction waveguides are also provided for respectively receiving the first and second reference optical signals as well as the coherent optical signals which are coupled out of the fiber interferometer after multiple traversals in the first and second opposed directions. In a preferred embodiment, the mixing means comprises first and second heterodyne detectors which are connected to the respective first and second extraction waveguides, the output from the heterodyne detectors comprising the first and second signals which are each substantially equal in frequency to the second, acoustic frequency. In this manner, a very large dimensional phase shift between the two output signals is achieved, which is more readily measurable by conventional electronics to achieve a more precise rotary motion measuring system.

BRIEF DESCRIPTION OF THE DRAWING

Various objects, features and attendant advantages of the present invention will be more fully appreciated as the same becomes better understood from the following detailed description of the present invention when considered in connection with the accompanying drawing, in which the sole FIGURE is a schematic representation which illustrates the main components of a preferred embodiment of an endless fiber interferometer rotary motion sensor of the present invention.

DETAILED DESCRIPTION OF THE PREFERRED EMBODIMENT

The sole FIGURE is a schematic illustration of a preferred embodiment of the present invention which consists essentially of an endless, multiple turn fiber interferometer waveguide 10 in combination with means for coupling optical energy thereinto and means for extracting same therefrom in such a fashion that the extracted information yields a precision indication of the rate of rotation of the object within which the interferometer 10 is mounted.

The ends of the interferometer waveguide 10 are joined in a fashion so as to minimize any reflection or absorbtion at the joint. The object of utilizing an endless, closed loop fiber interferometer waveguide 10 is to permit the coherent laser radiation coupled thereinto to circulate many times therewithin so as to cumulatively add to the phase shift upon each rotation therethrough.

Bursts of continuous wave radiation are inserted in both the clockwise (CW) and counter-clockwise (CCW) directions. These bursts are preferably equal to or shorter than one complete cycle around the interferometer waveguide fiber 10 in order to minimize possible interference. It is also desirable to offset the clockwise and counter-clockwise radiation in frequency for ease of electronic handling of the counter-clockwise and clockwise signals upon extraction from the interferometer waveguide 10.

For generation of the coherent optical signal a laser waveguide 12 is provided at one end of which is positioned a pumping source in the form of a light emitting diode $D_1$ for end-pumping the waveguide 12. The laser 12 may typically comprise a neodymium-doped YAG single crystal fiber. The waveguide 12 is positioned so as to extend on each side of the fiber interferometer waveguide 10 in such a fashion that the laser signal 32 traverses the interferometer 10 at an angle $\Delta$ which is sufficiently large (90° in the illustrated example) to ensure that none of the laser radiation will be trapped in the interferometer waveguide 10 unless so desired. A pair of gratings 16 and 18 are provided at each end of the laser waveguide 12 to cause reflection of the desired coherent radiation back and forth continuously in laser 12 which also assists in ensuring single mode operation thereof.

Positioned at an angle $\alpha$ with respect to waveguide 10 is an acousto-optic waveguide 20 which is also cut so as to direct acoustic waves through the interferometer waveguide 10. On the end of acoustic waveguide 20 is positioned a transducer 22 which permits the waveguide 20 to be acoustically end-driven by an acoustic signal F. The symbol $F_o$ represents the acoustic drive frequency utilized to insert the coherent optical radiation at a frequency $f_o$ into the waveguide 10, while the symbol $F_t$ represents the acoustic drive frequency utilized to extract the circulating signals from the waveguide 10 as well as to generate the reference signals by interacting with the coherent optical signal $f_t$, as will become more clear hereinafter.

The waveguides 10, 12 and 20, as well as the matrix within which they are embedded, have similar indices of refraction such that infrared radiation and acoustic waves will be minimally affected by propagation through the crossing waveguides. The waveguides may, for example, all be comprised of YAG single crystal fibers. The support matrix is preferably of a lower index of refraction and a higher acoustic velocity than the waveguides.

The geometry of the waveguides 10, 12 and 20, and the acousto-optic drive frequency $F_o$ are chosen such that the acousto-optic deflection of the laser radiation $f_o$ from waveguide 12 will match the insertion angle of the interferometer waveguide 10. The acoustic 20 basically sets up an acousto-optic grating, indicated generally by reference numeral 25, which consists of compression waves established across the intersection of waveguides 10, 12 and 20 that causes the signals traversing those paths to be deflected in a predictable manner.

Reference numerals 24 and 26 indicate respectively a pair of extraction waveguides, each of which have a heterodyne detector 28 and 30 positioned at the respective ends thereof. The waveguides 24 and 26 are oriented at particular angles with respect to the acoustic waveguide 20, and function in a manner which will be explained in greater detail hereinafter. The heterodyne detectors 28 and 30 may comprise, for example, a pair of diodes $D_3$ and $D_2$, respectively.

Reference numeral 32 indicates the coherent optical signal generated by laser 12 at an initial frequency $f_o$. This radiation is deflected into the interferometer waveguide 10 in a counter-clockwise direction at a frequency of $f_o - F_o$ and is indicated in the drawing by reference numeral 36.

The coherent optical radiation 32' which is propagating towards the pump diode 14 in the laser 12 is deflected into the interferometer 10 in a clockwise direction at a frequency of $f_o + F_o$ and is indicated in the drawing by reference numeral 38.

The acousto-optic interaction follows the Bragg equation: $\sin \alpha = \lambda/2\Lambda$ where $\lambda$ and $\Lambda$ are the wavelengths in the media. If $\alpha$ is 45°, $\sin \alpha$ is 0.707 and $\lambda$ is $0.529 \times 10^{-6}$ meters; $\Lambda$ is $0.409 \times 10^{-6}$ meters. Acoustic propagation in YAG is about $8.6 \times 10^3$ meters per sec., so $F_o$ must be 21.02 GHz. By choosing a smaller angle $\alpha$, the frequency $F_o$ can be decreased.

Since there exists no appreciable losses in the interferometer waveguide 10, the signals 36 and 38 simply keep circulating in a counter-clockwise and clockwise fashion. Signals 36 and 38 accumulate phase shifts, according to the Sagnac effect, in accordance with the mechanical rotation rate of the system. After sufficient multiple traversals of the waveguide 10 are achieved, another acoustic signal $F_t$ is impressed upon waveguide 20 to serve as an extraction signal and a reference establishing signal. Reference numeral 36' represents the counter-clockwise rotating coherent optical signal prior to partial extraction thereof, while reference numeral 38' represents the clockwise rotating coherent optical signal 38 after substantial traversals of the waveguide 10. The acousto-optic interaction of the radiation extraction is like that of the insertion except directions and angles are different in the embodiment illustrated in the drawing. That is, reference numeral 40 indicates a portion of the counter-clockwise signal 36' which is deflected into the waveguide 24 by the accousto-optic extraction frequency $F_t$. The frequency of signal 40 is equal to $(f_o - F_o + F_t)$.

Similarly, reference numeral 46 indicates a portion of the clockwise circulating coherent optical signal 38' which is extracted into waveguide 26 by the accousto-optic extraction frequency $F_t$. The frequency of signal 46 is equal to $(f_o + F_o - F_t)$.

At the time of extraction, the lasing frequency in waveguide 12 is $f_t$ which is assumed to be the same as $f_o$. The acousto-optic grating 25 at the drive frequency $F_t$ will therefore deflect the lasing frequency $f_t$ out of waveguide 12 into waveguide 24 as signal 42 having a frequency equal to $(f_t - F_t)$. Deflection into waveguide 26 of the laser signal 32' is indicated by signal 48 which comprises a reference signal having a frequency equal to $(f_t + F_t)$.

In the example illustrated in the drawing, $f_t$ enters the acousto-optic grating 25 at an angle of 45° and is deflected at an angle of 90° from the grating into waveguide 24. Two signals are, therefore heterodyned in diode $D_2$ at $(f_o + F_o - F_t)$ and $(f_t + F_t)$ with a beat frequency of $(F_o - 2 F_t)$ assuming $f_o = f_t$. Deflection of $f_t$ into waveguide 26 is like into waveguide 24 except that the directions are reversed so it becomes $f_t - F_t$. Diode $D_3$, therefore, heterodynes $(f_o - F_o + F_t)$ and $(f_t - F_t)$ to give a beat frequency of $(F_o - 2 F_t)$. The heterodyne beat frequency signals 44 and 50 from each diode 28 and 30 are the same but the phases are shifted according to the interferometer rotation rate. The signals 44 and 50 are fed to an appropriate phase shift measuring device 52. The signals 44 and 50 have complete phase rotation with respect to each other that is achieved from circulating the signals 36 and 38 through the interferometer waveguide 10, many times. This achieves a very large dimensional phase shift between the signals 44 and 50 which is more easily read by the electronics 52 to yield a much more precise rotational measurement than heretofore achievable.

In order that the present invention may be more readily understood, the following specific example and sample calculations are included to illustrate the feasibility and accuracy achievable. Assume the following:

| | |
|---|---|
| Radius of turns | R = 2 cm |
| Wavelength of radiation | $\lambda$ = 1.06 $\mu$m |
| Number of turns | N = $10^5$ |
| Rotation | $\Omega$ = $10^{-3}$ rad/sec |
| Index of refraction | $\eta$ = 1.83 |
| Velocity of propagation free space light | C = 3 × $10^8$ m/s |
| Velocity of propagation, acoustic in YAG | V = 8.6 × $10^3$ m/s |
| Fringe Shift = $4\pi r^{2n} N / \Psi_t$ | |
| = 15.8 × $10^{-6}$ rad. | |

Time t to make one rotation around the interferometer closed path = $2\pi rN\eta/C$ = 7.66 × $10^{-7}$ sec. Time for cycling through the closed interferometer fiber $10^6$ times is 0.766 sec. (This requires negligible losses.)

Fringe Shift for $10^6$ cycles = 15.8 rad. By assuming all the above ideal characteristics, a one milliradian per second rotation rate gives 15.8 radians phase shift (2.52 fringes). In this case, a burst of laser radiation somewhat less than 4.2 × $10^{-7}$ seconds long is coupled into the closed fiber interferometer in both the CW and CCW directions. This radiation cycles in both directions picking up 15.8 × $10^{-6}$ radians of relative phase shift for each of $10^6$ rotations. This is a total travel distance of $2\pi rN$ × $10^6$ or 1.256 × $10^8$ meters and requires 0.766 seconds. At only one db per KM loss, this attenuates the signals by 1.26 × $10^5$ db, which may be prohibitive. The closed fiber interferometer 10 is, therefore, preferably doped with Nd and pumped to give sufficient gain to keep the gain plus loss somewhat less than unity.

Losses in the waveguide 10 can be readily held to less than 5 db per KM and with special care and selection to less than 1 db per KM. The losses must be held to only a few db during the entire period of cycling in the closed interferometer 10. Some gain may therefore be required.

The interferometer waveguide is preferably wound on the inside of a good metal reflector and heat exchanger. One technique is to wind the waveguide fiber on a dissolvable core, deposit a good reflecting film of metal over the fiber coil, and then put the total in a good heat conducting material. The core is then dissolved leaving the fiber coil on the inside of the remaining cylinder. The fiber may be made of glassy or single crystal materials such as YAG and must have some material such as Neodymium (Nd) which can support light amplification through stimulated emission. Pumping radiation at the inside of the cylinder is used to invert the energy levels in the Nd so as to amplify radiation passing through the fiber but this pump power must be low enough so that amplification does not exceed losses.

The deflection of $f_t$ into waveguides 24 and 26 follows the equation $\Lambda (\sin \theta_m - \sin \theta_i) = m\lambda$ where $\Lambda$ is the acoustic wavelength of $F_t$, m is the deflection order which is plus or minus 1, $\lambda$ is the optical wavelength in the media (0.579 × $10^{-6}$m at an index of 1.83), $\theta_m$ is the angle the radiation exits the grating (45° in the example). $\Lambda$, therefore, is 1.976 × $10^{-6}$m and $F_t$ is 4.35 × $10^9$ Hz in the example. $F_o - 2 F_t$ is 12.33 × $10^9$ Hz in the example. As pointed out above, a different geometry can be used to reduce the frequencies.

Further heterodyning of the $F_o - 2 F_t$ frequencies against stable reference frequencies can be used, for example, to decrease the beat frequencies to 23.8 × $10^6$ Hz. One complete cycle of relative phase shift would be 0.042 × $10^{-6}$ sec. and can be measured to 1 part in 4.2 with, for example, a HP Model 5328A time interval meter. A 1 milliradian per second rotation rate gives 2.52 cycles (15.8 radians) of phase shift and can be measured to a part in 10. Heterodyning to 2.38 × $10^6$ Hz increases the measurement accuracies to a part in 100 for a 1 milliradian per second interferometer rotation rate. Increasing the length of the interferometer waveguide to 1,256 meters would allow the lowest beat frequency to be reduced by a factor of 10 and increase readout accuracy to a part in 1000 for a rotation rate of 1 milliradian per second.

The extraction frequency $F_t$ should be held on for a few microseconds after the CW and CCW radiation has been extracted to insure that all radiation is out of the interferometer before the next insertion cycle. This gives additional 0.42 microseconds bursts of the $F_o - 2 F_t$ beat frequencies. There are fixed transient periods between the bursts. These additional bursts can be used to increase the measurement period.

Obviously, numerous modifications and variations of the present invention are possible in light of the above teachings. It is therefore to be understood that within the scope of the appended claims, the invention may be practiced otherwise than as specifically described herein.

I claim as my invention:

1. A rotary motion sensor, which comprises:
   means for generating a coherent optical signal at a first frequency;
   an endless, closed-loop, multiple-turn fiber interferometer;

means for coupling said coherent optical signal into said interferometer in first and second opposed directions;

means for generating first and second reference optical signals which are each offset in frequency from said first frequency by a second frequency;

means for coupling said coherent optical signals traveling in said first and second opposed directions out of said fiber interferometer after multiple traversals thereof;

means for mixing said coherent optical signals coupled out of said interferometer with said first and second reference signals, respectively to produce first and second signals of substantially the same frequency; and means for detecting the relative phase shift between said first and second signals.

2. A rotary motion sensor as set forth in claim 1, wherein said means for coupling said coherent optical signal into said interferometer in first and second opposed directions comprises means for generating an acousto-optic grating across the path of said coherent optical signal and said fiber interferometer.

3. A rotary motion sensor as set forth in claim 2, wherein said means for generating an acousto-optic grating comprises an acoustic waveguide driven by a transducer at said second frequency.

4. A rotary motion sensor as set forth in claim 3, wherein said means for generating an acousto-optic grating also comprises said means for generating first and second reference optical signals.

5. A rotary motion sensor as set forth in claim 1, wherein said means for generating first and second reference optical signals comprises means for generating an acousto-optic grating across the path of said fiber interferometer.

6. A rotary motion sensor as set forth in claim 5, further comprising first and second extraction waveguides for respectively receiving said first and second reference optical signals as well as said coherent optical signals traveling in said first and second opposed directions coupled out of said fiber interferometer.

7. A rotary motion sensor as set forth in claim 6, wherein said means for coupling said coherent optical signals out of said interferometer into said first and second extraction waveguides comprises said means for generating an acousto-optic grating.

8. A rotary motion sensor as set forth in claim 7, wherein said mixing means comprises first and second heterodyne detectors connected to the respective first and second extraction waveguides, the output from said heterodyne detectors comprising said first and second signals each substantially equal in frequency to said second frequency.

9. A rotary motion sensor as set forth in claim 8, wherein said means for generating an acousto-optic grating comprises an acoustic waveguide driven by a transducer at said second frequency.

10. A rotary motion sensor as set forth in claim 1, wherein said means for coupling said coherent optical signal into said interferometer, said means for generating first and second reference optical signals, and said means for coupling said coherent optical signals out of said fiber interferometer, all comprise the same means for generating an acousto-optic grating across the path of said coherent optical signal and said fiber interferometer.

* * * * *